United States Patent
Ohashi et al.

(10) Patent No.: US 11,893,583 B2
(45) Date of Patent: Feb. 6, 2024

(54) SETTLEMENT SYSTEM, SETTLEMENT METHOD, USER DEVICE, AND SETTLEMENT PROGRAM

(71) Applicant: Nippon Telegraph and Telephone Corporation, Tokyo (JP)

(72) Inventors: Shigenori Ohashi, Yokosuka (JP); Atsushi Nakadaira, Yokosuka (JP); Shigeru Fujimura, Yokosuka (JP); Masayoshi Chikada, Yokosuka (JP); Tatsuro Ishida, Yokosuka (JP); Hiroki Watanabe, Yokosuka (JP); Kota Hidaka, Yokosuka (JP); Junichi Kishigami, Muroran (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 142 days.

(21) Appl. No.: 17/275,103

(22) PCT Filed: Sep. 20, 2019

(86) PCT No.: PCT/JP2019/037063
§ 371 (c)(1),
(2) Date: Mar. 10, 2021

(87) PCT Pub. No.: WO2020/059865
PCT Pub. Date: Mar. 26, 2020

(65) Prior Publication Data
US 2022/0051235 A1 Feb. 17, 2022

(30) Foreign Application Priority Data
Sep. 20, 2018 (JP) .................................. 2018-176397

(51) Int. Cl.
*G06Q 20/02* (2012.01)
*G06Q 20/06* (2012.01)
(Continued)

(52) U.S. Cl.
CPC .......... *G06Q 20/389* (2013.01); *G06F 21/64* (2013.01); *G06Q 20/3825* (2013.01);
(Continued)

(58) Field of Classification Search
CPC ............. G06Q 20/389; G06Q 20/3825; G06Q 20/3827; G06Q 20/027; G06Q 20/065;
(Continued)

(56) References Cited

U.S. PATENT DOCUMENTS

2016/0330034 A1\* 11/2016 Back ..................... G06Q 20/065
2017/0046651 A1\* 2/2017 Lin .......................... G06F 21/62
(Continued)

FOREIGN PATENT DOCUMENTS

WO   WO-2017098519 A1 \*  6/2017

OTHER PUBLICATIONS

[No Author Listed], "Niji: Autonomous Payment Bridge between Bitcoin and Consortium Blockchain," The 2018 IEEE International Conference on Blockchain (Blockchain-2018), Halifax, CA, Jul. 30-Aug. 3, 2018, 75 pages.
(Continued)

*Primary Examiner* — Clifford B Madamba
(74) *Attorney, Agent, or Firm* — Fish & Richardson P.C.

(57) ABSTRACT

A settlement system includes a service provider device 2 which transmits a template information transaction including a template of a transaction to a network 4 of a first blockchain, a user device which transmits, to the network 4 of the first blockchain, a payment information transaction that includes an electronic signature generated by using the template of the transaction and a payment amount, and a smart contract 41, wherein the smart contract 41 verifies the electronic signature by using the payment amount and the template of the transaction, the service provider device 2 generates a settlement transaction by using the template of
(Continued)

the transaction, the electronic signature and the payment amount, and transmits the settlement transaction to a network 3 of a second blockchain, a plurality of output conditions are set to the template of the transaction, and the settlement transaction becomes usable when any one of the plurality of output conditions is satisfied.

5 Claims, 12 Drawing Sheets

(51) Int. Cl.
| | | |
|---|---|---|
| | *G06Q 20/38* | (2012.01) |
| | *G06F 21/64* | (2013.01) |
| | *H04L 9/00* | (2022.01) |
| | *H04L 9/32* | (2006.01) |
| | *H04L 9/40* | (2022.01) |

(52) U.S. Cl.
CPC ....... *G06Q 20/3827* (2013.01); *H04L 9/3247* (2013.01); *H04L 9/50* (2022.05); *H04L 2209/56* (2013.01)

(58) Field of Classification Search
CPC ... G06Q 20/3829; G06F 21/64; G06F 21/645; H04L 9/3247; H04L 9/50; H04L 2209/56; H04L 63/108; H04L 63/126; H04L 9/3239
USPC .......................................................... 705/44
See application file for complete search history.

(56) References Cited

U.S. PATENT DOCUMENTS

| | | | |
|---|---|---|---|
| 2017/0085545 A1* | 3/2017 | Lohe | .................... G06Q 20/065 |
| 2022/0156725 A1* | 5/2022 | Iwama | .................. G06Q 20/10 |

OTHER PUBLICATIONS

En.Bitcoin.it, [online], "Payment Channels," May 2018, retrieved on Mar. 5, 2021, retrieved from URL<https://en.bitcoin.it/w/index.php?title=Payment_channels&oldid=65341>, 5 pages.

* cited by examiner

FIG. 4
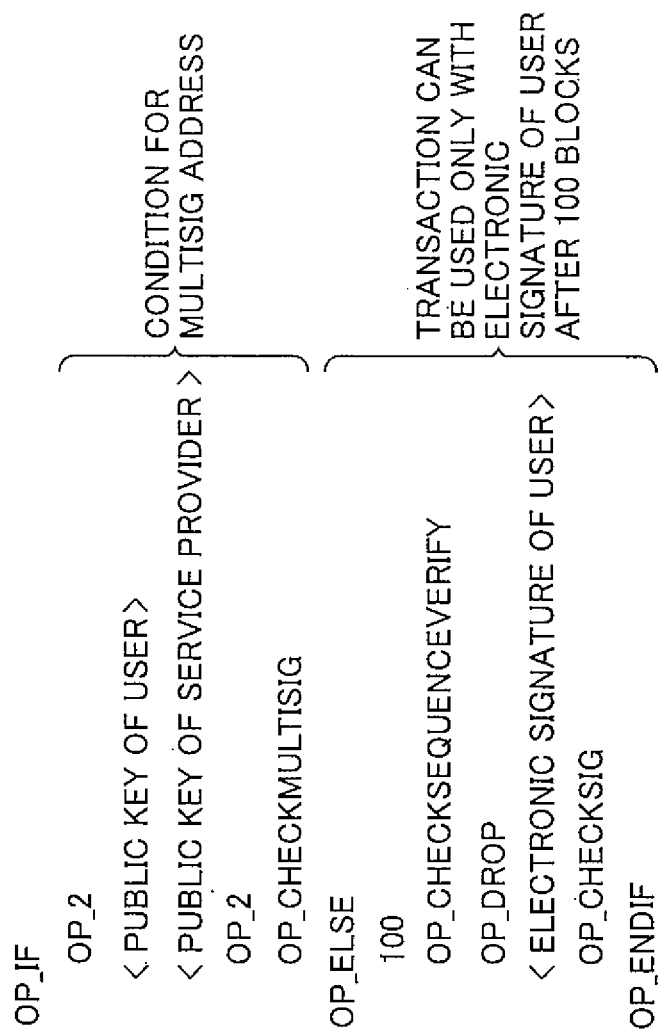
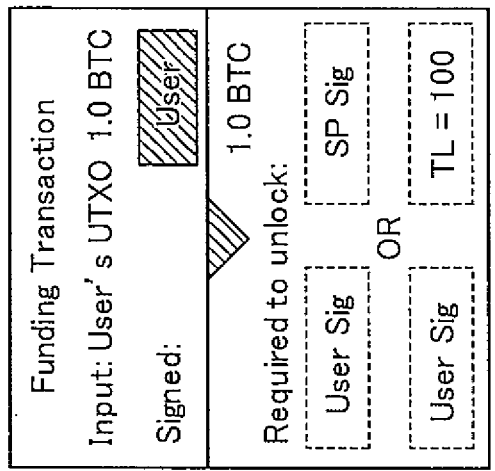

FIG. 5

| | ITEM | VALUE |
|---|---|---|
| INPUT | PREVIOUS TRANSACTION | TXID OF FUNDING TRANSACTION FOR FUNDING DEPOSIT TO MULTISIG ADDRESS |
| | SCRIPT | SCRIPT OF FUNDING TRANSACTION (OUTPUT CONDITION) |
| | ELECTRONIC SIGNATURE (MULTISIG ADDRESS REQUIRES TWO ELECTRONIC SIGNATURES) | \<null\> |
| OUTPUT 1 | AMOUNT OF MONEY FUNDED (AMOUNT OF PAYMENT) | \<null\> |
| | DESTINATION | HASH OF SCRIPT SPECIFYING CONDITION 1, CONDITION 2 |
| OUTPUT 2 | AMOUNT OF MONEY FUNDED (CHANGE) | \<null\> |
| | DESTINATION | USER ADDRESS |

FIG. 6

```
OP IF
    OP HASH160
    < HASH OF PRE-IMAGE >
    OP EQUALVERIFY                          ⎫ CONDITION 2
    < PUBLIC KEY OF USER >                  ⎬ FUND CAN BE TRANSFERRED ONLY WITH
                                            ⎭ ELECTRONIC SIGNATURE OF USER
                                              IF PRE-IMAGE IS ACQUIRED
OP ELSE
    110
    OP_CHECKSEQUENCEVERIFY                  ⎫ CONDITION 1
    OP DROP                                 ⎬ FUND CAN BE TRANSFERRED ONLY WITH
    < PUBLIC KEY OF SERVICE PROVIDER >      ⎭ ELECTRONIC SIGNATURE OF SERVICE
                                              PROVIDER AFTER 110 BLOCKS
OP ENDIF
OP CHECKSIG
```

SETTLEMENT SYSTEM, SETTLEMENT METHOD, USER DEVICE, AND SETTLEMENT PROGRAM

CROSS-REFERENCE TO RELATED APPLICATIONS

This application is a National Stage application under 35 U.S.C. § 371 of International Application No. PCT/JP2019/037063, having an International Filing Date of Sep. 20, 2019, which claims priority to Japanese Application Serial No. 2018-176397, filed on Sep. 20, 2018. The disclosure of the prior application is considered part of the disclosure of this application, and is incorporated in its entirety into this application.

TECHNICAL FIELD

The present invention relates to a blockchain technology, and more particularly to a technique of cooperating a plurality of blockchains.

BACKGROUND ART

Mechanisms that can ensure the reliability without requiring the centralized management are becoming popular, centering on Bitcoin, digital cryptocurrency. In one of these mechanisms called a blockchain, the reliability of pieces of communicated information is ensured by a process of consensus built in a distributed network, and the soundness is kept by preventing frauds such as falsifications and double-spending in an entire system.

In the blockchain, pieces of transaction information on cryptocurrency among participants (transactions) are collected together into a unit called a "block", and individual blocks are linked in the form of a chain and are managed in a chronological order. A new block is approved through a consensus algorithm in a distributed network such as Proof of Work. The approval of a new block means that the currency transaction recorded in the block is consented in the entire system. A ledger of a series of pieces of transaction information managed by using the blockchain are called a "distributed ledger", and each node (each terminal) participating in the network has the same distributed ledger.

Bitcoin is applied with devisal for implementation called an off-chain transaction. In an off-chain transaction system, only a result of a final transaction among transactions made between two participants outside the blockchain is recorded in the blockchain instead of recording all transactions in the blockchain. As disclosed in Non-patent document 1, in a payment channel which is one of the systems of the off-chain transaction, a channel can be built in which the virtual payment is realized by exchanging pieces of incomplete transactions between two users.

PRIOR ART DOCUMENT

Non-Patent Document

Non-patent document 1: bitcoin wiki, "Payment channels," https://en.bitcoin.it/wiki/Payment_channels

SUMMARY OF THE INVENTION

Problem to be Solved by the Invention

A method has been conceived in which, by applying a unidirectional payment channel such as "Spillman-style payment channels" or "CLTV-style payment channels," an incomplete transaction acquired by excluding an electronic signature and the amount of payment from a transaction for a blockchain for cryptocurrency is generated, and by updating the incomplete transaction in another blockchain, the virtual payment with Bitcoin is possible on another blockchain even if terminals are not connected to the blockchain for cryptocurrency.

However, in this method, although a user can make a payment to a service provider for a service provided, a payment in a reverse direction (a payment from the service provider to the user) is not possible. In other words, even if the cancellation of the payment occurs, the service provider is not able to refund the money back to the user by using the same channel.

The above is caused because the method adopts a from in which only the service provider has the right to broadcast the latest transaction generated from the incomplete transaction to the blockchain for cryptocurrency, and only the user updates the amount of money of the incomplete transaction. Suppose that, for example, the user cancels the previously updated amount of payment and updates an incomplete transaction with the amount of payment which is lower than the previous amount of payment. In this case, it is the service provider who determines to generate a final transaction with the amount of payment of what point in time of the incomplete transaction to broadcast the transaction to the blockchain for cryptocurrency.

Therefore, it is not possible to eliminate the possibility that the service provider broadcasts, to the blockchain for cryptocurrency, a transaction of a high amount of payment not reflected with the cancellation, instead of broadcasting, to the blockchain for cryptocurrency, a transaction with a low amount of payment reflected with the cancellation.

The present invention has been made in view of the above problems, and it is an object of the present invention to efficiently cooperate a plurality of blockchains and to reflect the cancellation of payment consented between a user and a service provider to a blockchain for cryptocurrency.

Means for Solving the Problem

To achieve the above object, an aspect of the present invention provides a settlement system in which a first blockchain and a second blockchain are cooperated, including a service provider device that transmits a template information transaction that includes a template of a transaction to a network of the first blockchain, a user device that transmits, to the network of the first blockchain, a payment information transaction that includes an electronic signature generated by using the template of the transaction registered in the first blockchain and a payment amount, and a smart contract included in the first blockchain, wherein the smart contract verifies the electronic signature included in the payment information transaction by using the payment amount and the template of the transaction, the service provider device generates a settlement transaction by using the template of the transaction registered in the first blockchain, the electronic signature, and the payment amount, and transmits the settlement transaction to a network of the second blockchain, and a plurality of output conditions are set to the template of the transaction, and the settlement transaction becomes usable when any one of the plurality of output conditions is satisfied.

An aspect of the present invention provides a settlement method in which a first blockchain and a second blockchain are cooperated, including transmitting, by a service provider device, a template information transaction that includes a template of a transaction to a network of the first blockchain, generating, by a user device, an electronic signature by using the template of the transaction registered in the first blockchain, and transmitting, by the user device, a payment information transaction that includes the electronic signature and a payment amount to the network of the first blockchain, wherein a smart contract included in the first blockchain verifies the electronic signature included in the payment information transaction by using the payment amount and the template of the transaction, the service provider device generates a settlement transaction by using the template of the transaction registered in the first blockchain, the electronic signature, and the payment amount, and transmits the settlement transaction to a network of the second blockchain, and a plurality of output conditions are set to the template of the transaction, and the settlement transaction becomes usable when any one of the plurality of output conditions is satisfied.

An aspect of the present invention provides a user device in a settlement system in which a first blockchain and a second blockchain are cooperated, including a funding transaction generating unit that transmits, to a network of the second blockchain, a funding transaction for funding the predetermined amount of deposit, and a payment transaction generation unit generates an electronic signature by using the template of the transaction registered in the first blockchain by a service provider device and transmits a payment information transaction that includes an electronic signature and a payment amount to a network of the first blockchain; wherein a plurality of output conditions are set to the template of the transaction, and a settlement transaction generated by the service provider device by using the template of the transaction, the electronic signature, and the payment amount becomes usable when any one of the plurality of output conditions is satisfied.

An aspect of the present invention provides a settlement program that causes a computer to function as the user device.

Effect of the Invention

According to the present invention, a plurality of blockchains can be efficiently cooperated, and the cancellation of payment consented between a user and a service provider can be reflected to a blockchain for cryptocurrency.

BRIEF DESCRIPTION OF THE DRAWINGS

FIG. 4 illustrates output conditions of a funding transaction.

FIG. 5 is an image diagram of a transaction template.

FIG. 6 illustrates examples of scripts indicating output conditions of a transaction template.

MODE FOR CARRYING OUT THE INVENTION

An embodiment of the present invention will be described below with reference to the drawings.

Figure 1:
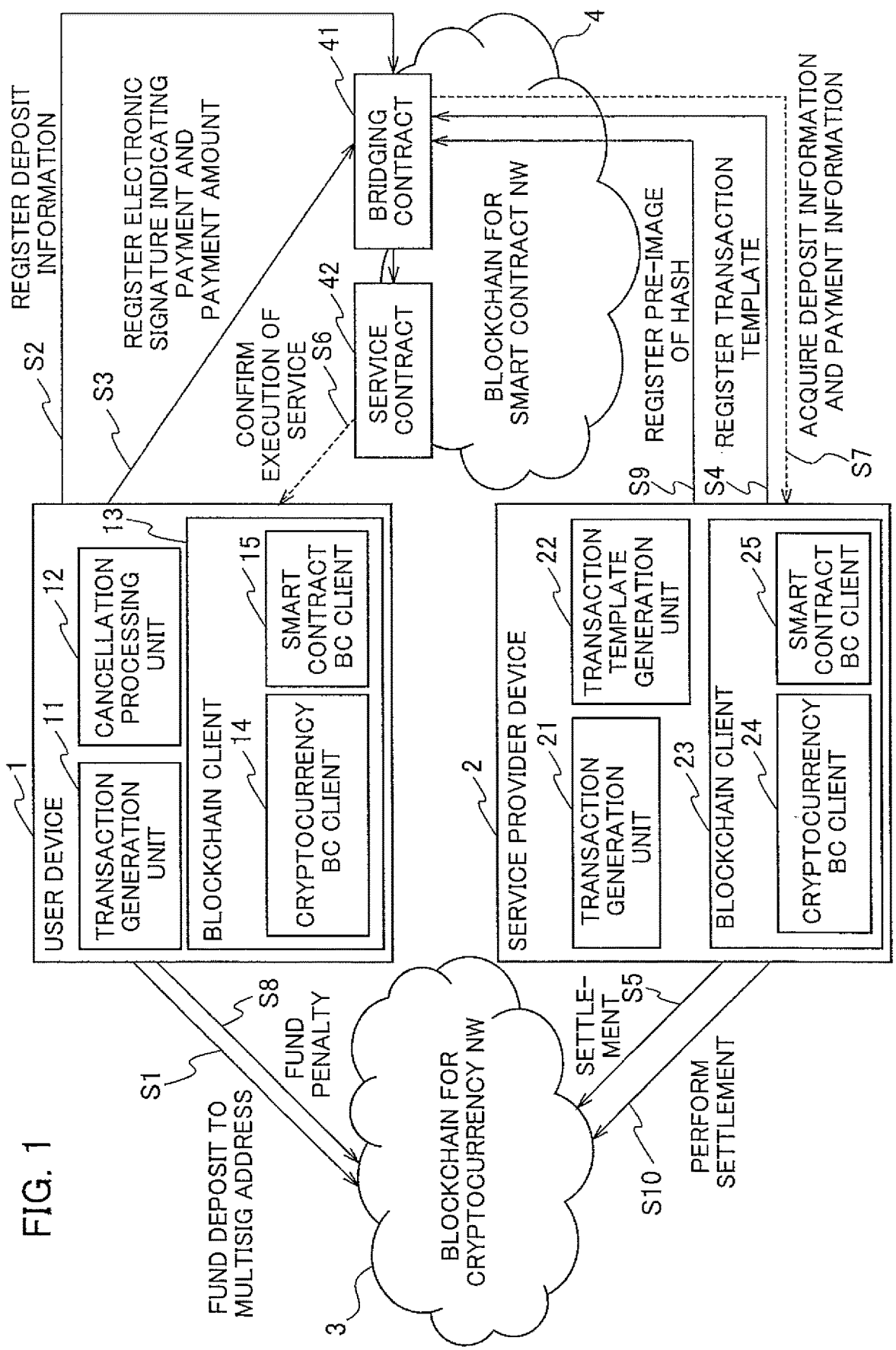
FIG. 1 illustrates an entire configuration of a settlement system according to an embodiment of the present invention.

FIG. 1 is a diagram illustrating an overall configuration of a settlement system according to an embodiment of the present invention. The settlement system is a system cooperating payment with cryptocurrency in a blockchain for cryptocurrency (a second blockchain) with a service provided by a blockchain for smart contract (a first blockchain).

The blockchain for cryptocurrency is a distributed ledger that is shared by nodes participating in P2P network 3 (hereinafter referred to as "cryptocurrency network") of the blockchain for cryptocurrency. A transaction history of the cryptocurrency is registered in the blockchain for cryptocurrency. After a transaction described with transaction information as to how much cryptocurrencies are moved from where to where is broadcast to the cryptocurrency network 3, a block including the transaction is generated, and then, the generated block is added to the end of the blockchain for cryptocurrency.

The blockchain for smart contract is a distributed ledger that is shared by nodes participating in P2P network 4 (hereinafter referred to as "smart contract network") of the blockchain for smart contract. After a transaction is broadcast to the smart contract network 4, a block including the transaction is generated, and then, the generated block is added to the end of the blockchain for smart contract. When the block is added to the blockchain for smart contract, a script code registered in advance (i.e., a smart contract) is executed on each terminal of each participating node by assuming the transaction included in the block as an input, and then, the distributed ledger is updated. Examples of platforms for realizing such blockchain for smart contract include Ethereum, Hyperledger Fabric and the like.

A user device 1 is used by a user of a service provided by the blockchain for smart contract. The user device 1 includes a transaction generation unit 11, a cancellation processing unit 12, and a blockchain client 13.

The transaction generation unit 11 generates transactions necessary in each of "setting", "payment", "settlement", and "cancellation" processes (steps) which will be described later. The generated transactions are transmitted to the network 3 or 4 of a corresponding blockchain via the blockchain client 13.

In the "setting" process, the transaction generation unit 11 generates "a funding transaction for funding a deposit from a user address to a multisig address" (a funding transaction) and transmits the generated transaction to the cryptocurrency network 3 (step S1). Thereafter, the user device 1 generates "a transaction for registering deposit information" (a deposit information transaction) and transmits the generated transaction to the smart contract network 4 (step S2).

In the "payment" process and the "cancellation" process, the transaction generation unit 11 generates "a transaction for registering an electronic signature indicating the payment and the amount of payment" (a payment information transaction) and transmits the generated transaction to the smart contract network 4 (step S3).

In the "settlement" process, if a service provider violates the consent of cancellation, the transaction generation unit 11 generates "a transaction for funding, to the user address, funds that have been supposed to be received by the service provider of a settlement transaction" (a penalty transaction) and transmits the generated transaction to the cryptocurrency network 3 (step S8).

If the payment information transaction registered in the blockchain for smart contract is cancelled, the cancellation processing unit 12 transmits a cancellation request to a service provider device 2.

Figure 2:
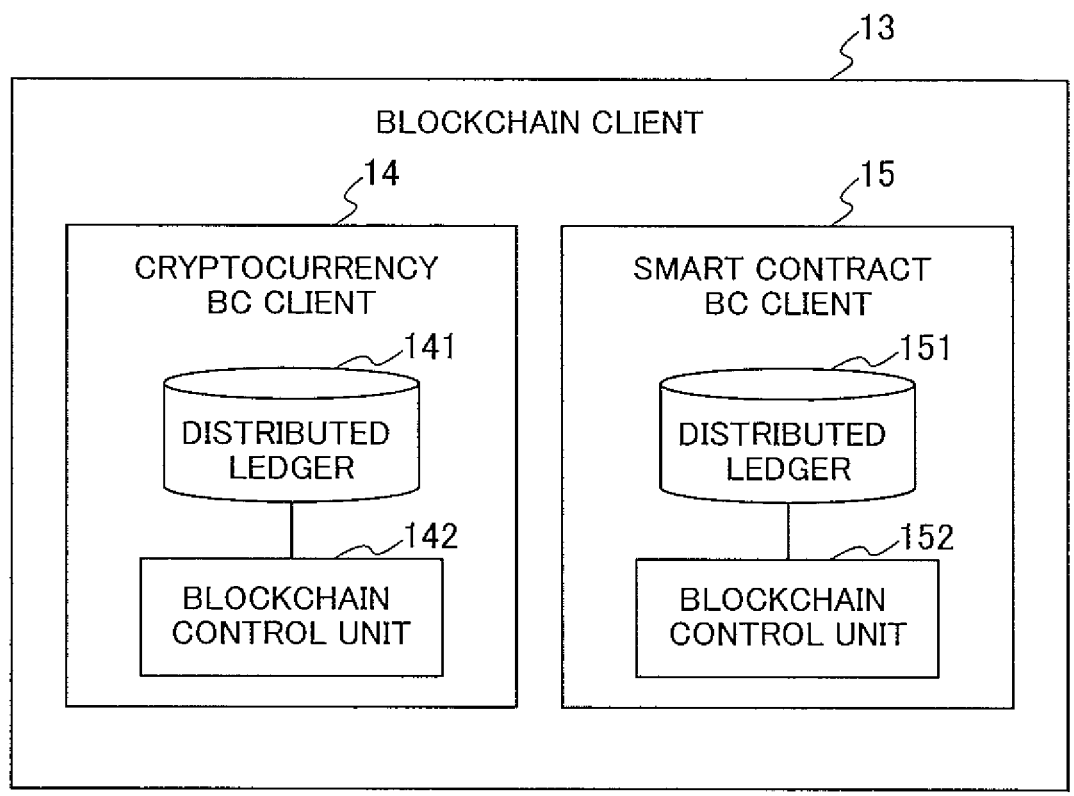
FIG. 2 is a block diagram illustrating a constitution of a blockchain client.

FIG. 2 is a block diagram illustrating a constitution of the blockchain client 13. The user device 1 according to the present embodiment is connected to the cryptocurrency network 3 and the smart contract network 4. Therefore, the blockchain client 13 includes a cryptocurrency blockchain client 14 and a smart contract blockchain client 15.

The cryptocurrency blockchain client 14 includes a distributed ledger 141 and a blockchain control unit 142. The distributed ledger 141 stores the latest blockchain in almost real time by being loosely synchronized with all terminals (devices) connected to the cryptocurrency network 3 via the blockchain control unit 142.

The blockchain control unit 142 autonomously and decentrally cooperates with the terminals connected to the cryptocurrency network 3 to keep a system of blockchains. Specifically, the blockchain control unit 142 accesses the distributed ledger 141 to read or update the blockchain in the distributed ledger 141. The blockchain control unit 142 transmits the transaction to the cryptocurrency network 3.

The smart contract blockchain client 15 includes a distributed ledger 151 and a blockchain control unit 152. The distributed ledger 151 and the blockchain control unit 152 are similar to the distributed ledger 141 and the blockchain control unit 142.

The service provider device 2 is used by a service provider who operates a service on the blockchain for smart contract. The service provider provides some kind of service (for example, right registration for digital contents and the like) to the user after receiving the payment from the user.

The service provider device 2 includes a transaction generation unit 21, a transaction template generation unit 22, and a blockchain client 23.

The transaction generation unit 21 and transaction template generation unit 22 generate transactions necessary in each of the "setting", "cancellation", and "settlement" processes among the "setting", "payment", "cancellation", and "settlement" processes.

In the "setting" process, and the "cancellation" process, the transaction template generation unit 22 generates "a transaction for registering a transaction template" (a template information transaction) and transmits the generated transaction to the smart contract network 4 (step S4). Details about the transaction template will be described later.

In the "cancellation" process, the transaction generation unit 21 generates "a transaction for registering pre-images of hashs in output conditions of the transaction template" (a pre-image transaction)) and transmits the generated transaction to the smart contract network 4 (step S9).

In the "settlement" process, the transaction generation unit 21 generates "a transactions for settling the deposit of the multisig address" (a settlement transaction) and transmits the generated transaction to the cryptocurrency network 3 (step S5). Further, the transaction generation unit 21 generates "a transaction for executing a settlement and finalizing the payment from the multisig address to an address of the service provider" (a settlement execution transaction) and transmits the generated transaction to the cryptocurrency network 3 (step S10).

The blockchain client 23 is similar to the blockchain client 13 of the user device 1 (see FIG. 2), and thus, descriptions of the blockchain client 23 are omitted here.

As one of features of the present embodiment, two smart contracts are registered in advance on the smart contract network 4. Specifically, a bridging contract 41 and a service contract 42 are registered in each distributed ledger 151 on each terminal connected to the network 4 according to a protocol of the blockchain for smart contract.

A bridging contract is a smart contract for cooperating a blockchain for cryptocurrency with a blockchain for smart contract. The bridging contract receives payment information (an electronic signature and the amount of payment) from the user device 1, and then, verifies whether the received information on the payment is valid.

The service contract is a smart contract that performs services (for example, the transfer of content rights and the like) operated by the service provider after the bridging contract confirms the validity of the payment information.

Both types of the above described smart contracts include APIs (Application Programming Interfaces) for checking and referring to states of stored variables. For example, the user device 1 acquires an execution result of the service contract from the distributed ledger 151 of the user device 1 by using the API (step S6). Further, the service provider device 2 acquires deposit information and payment information registered in the bridging contract from the distributed ledger of the service provider device 2 by using the API (step S7). Short dashed lines in steps S6 and S7 in FIG. 1 respectively illustrate processes of referring to the distributed ledgers stored in the user device and the service provider device.

Next, the processes in the present embodiment will be described. In the present embodiment, three basic processes that are, the "setting", "payment" and "settlement" processes and an application process that is an application "cancellation" process are performed.

Figure 3:
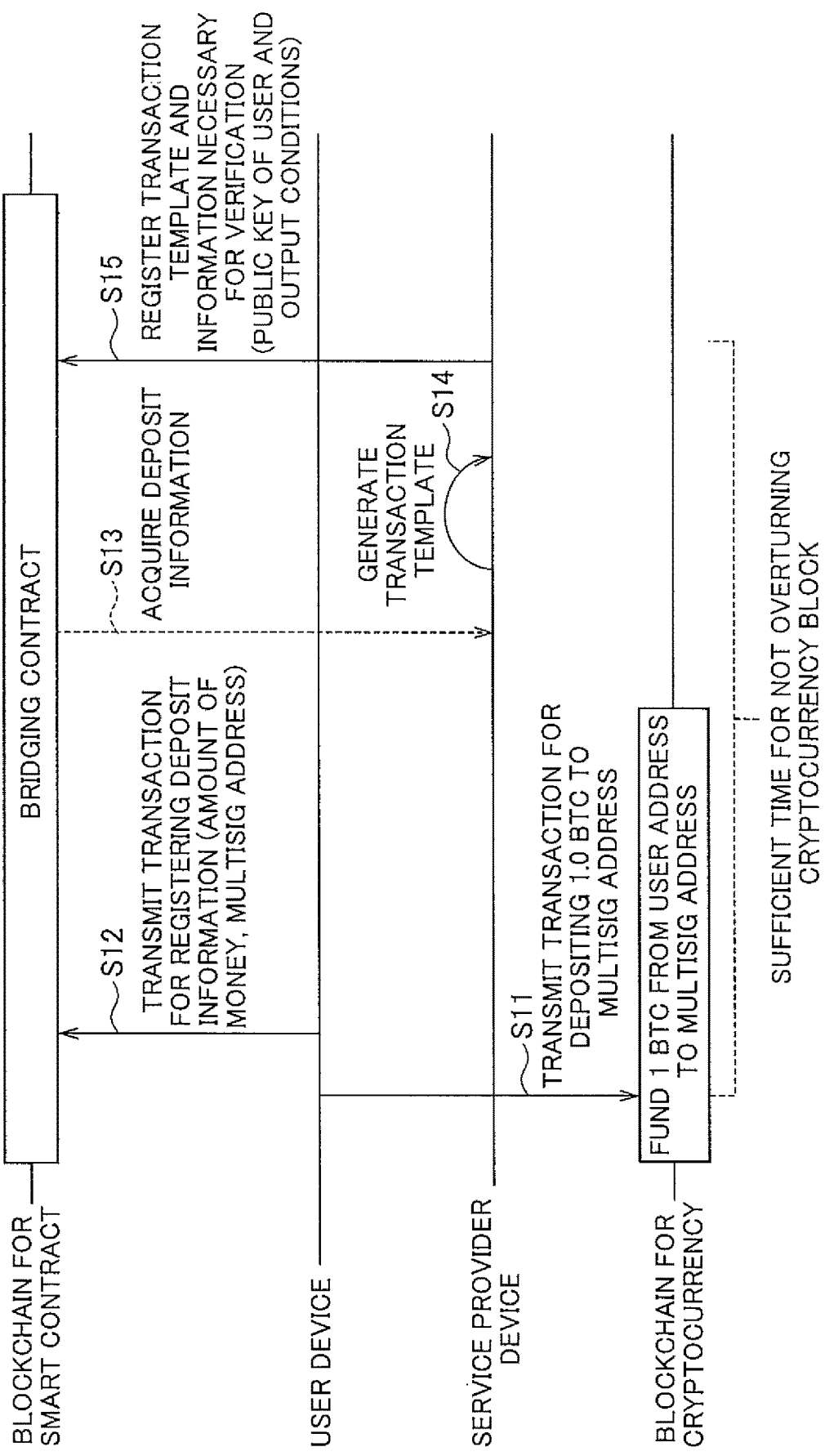
FIG. 3 is a schematic view illustrating a "setting" process.

FIG. 3 illustrates a schematic view of the "setting" process. In the "setting" process, preparations necessary for the next "payment" process are made.

First, the user device 1 generates the funding transaction, and then, transmits (broadcasts) the funding transaction to the cryptocurrency network 3 (step S11). The funding transaction is a transaction for funding the predetermined amount of deposit (a guarantee deposit) from the user address (a wallet) to the multisig address that is jointly managed by the user and the service provider.

The multisig address is an address in which, in the blockchain for cryptocurrency, electronic signatures of a plurality of persons are required for a transactions at the time of payment. The present embodiment adopts a multisig address which requires an electronic signature of a user and an electronic signature of a service provider. It is assumed here, for example, that 1.0 BTC is funded to the multisig address.

After the funding transaction is transmitted to the cryptocurrency network 3, a block including the funding transaction is generated, and then, the block is reflected to distributed ledgers (blockchains) of all of the terminals connected to the cryptocurrency network 3 through the loose synchronization among the terminals. In this case, in the blockchain for cryptocurrency, it is finalized that a deposit of 1.0 BTC is funded from the user address to the multisig address.

In the present embodiment, the funding transaction is set with an output condition that allows the funding transaction to be used only with an electronic signature of the user device 1 if a predetermined time period (a first time period) elapses. More specifically, after an elapse of a constant time period from when the funding transaction in step S11 is included in the blockchain, it is possible to make the payment only with the electronic signature of the user. That is, after an elapse of a constant time period from when the block including the funding transaction is registered in the blockchain, the user can use the funding transaction as an input of a next transaction. Such time limit is called a "time lock". A time period of the time lock is set as, for example, a time period required for connecting a predetermined number of blocks (for example, 100 blocks) after a time point at which the funding transaction in step S11 is included in the blockchain. By setting such output conditions to the funding transaction, the user comes to be able to refund (fund) the deposit of the multisig address to the users address after an elapse of the time period of the time lock.

Application of the time lock to the multisig address can prevent the non-transmission of the settlement transaction by the service provider, the interruption of communication with the service provider, and the deadlock of the user's deposit. For example, when a time lock of 100 blocks is applied, after an elapse of 100 blocks or more, the user can generate a refund transaction to fund (refund) the deposit funded to the multisig address to the user address only with the electronic signature of the user.

In Bitcoin, conditions may be specified for transaction outputs with scripts. The time lock is one of attributes of the transaction and causes the transaction to be not approved until a time or a clock time specified in the time lock (treated as a fraudulent transaction when a minor generates a block).

FIG. 4 is a diagram for explaining output conditions of a funding transaction according to the present embodiment. FIG. 4(*a*) is a schematic view illustrating the output conditions of the funding transaction. In FIG. 4(*a*), "User" indicates a user and "SP" indicates a service provider. An example of FIG. 4(*a*) illustrates a condition for a multisig address that requires an electronic signature of "User" (user) and an electronic signature of "SP" (service provider) and illustrates that the funding transaction may be used only with the electronic signature of "User" at or after the clock time specified in the time lock (in this example, at or after 100 blocks). FIG. 4(*b*) is an example of Bitcoin scripts for the output conditions illustrated in FIG. 4(*a*).

Next, the user device 1 transmits a transaction for registering deposit information on a deposit (a deposit information transaction) to the smart contract network 4 (step S12). The transaction includes, as the deposit information, at least the amount of funded deposit, and may further include pieces of information on an ID of the funding transaction in step S11, the multisig address and the like.

By transmitting the transaction to the smart contract network 4, a block including the transaction is generated, and the generated block is reflected to the distributed ledgers of all of the terminals connected to the smart contract network 4 through the loose synchronization among the terminals. This causes the deposit information to be registered in a storage area managed by each bridging contract of each of the distributed ledgers in each of all terminals.

The service provider device 2 acquires the deposit information registered by the user device 1 from the bridging contract registered in the distributed ledger of the service provider device 2 (step S13). The service provider device 2 creates a template of a transaction (a transaction template) by using the acquired deposit information (step S14). The transaction template in this case indicates a form of an incomplete transaction which is acquired by transforming the transaction of the blockchain for cryptocurrency. Specifically, the transaction template is a transaction acquired by excluding pieces of information on "the amount of money funded" and "all electronic signatures" from "a settlement transaction indicating funding from the multisig address" in the "settlement" process which will be described later.

FIG. 5 illustrates an image of the transaction template. In an illustrated example, columns for "all of electronic signatures" required for inputs and columns for "the amount of money funded" required for outputs are indicated as "null" (empty columns). Further, in the example of FIG. 5, two outputs (output 1 and output 2) and two types of amounts of money funded are illustrated. One is basically the amount money to be funded to the service provider, and the other is the amount money to be funded as a change to the user. A destination of the output 1 is set with a hash value of a script that specifies output conditions (condition 1 and condition 2) which will be described next.

In step S11, 1.0 BTC is deposited to the multisig address. In the next "payment" process, the user device 1 updates "the amount of money funded (i.e., the amount of payment and the change.)" and the "electronic signatures" of the transaction template within a range of the deposit (1.0 BTC) to generate the payment information transaction, and then, the user device 1 is supposed to submit the payment information transaction to the bridging contract.

In the present embodiment, a plurality of output conditions are set for the output 1 of the transaction template, and the settlement transaction in the "settlement" process, which will be described later, becomes usable when any one of the plurality of output conditions is satisfied. In this case, the following two output conditions are set.

FIG. 6 illustrates an example of Bitcoin scripts representing output conditions of the conditions 1 and 2.

The condition 1: Outputs of the transaction template (the incomplete transaction) are limited by the time lock. After an elapse of a constant time period of the specified time lock (a second time period), the service provider device 2 can use the settlement transaction generated by using the transaction template as an input (INPUT) of a next transaction. The constant time period of the time lock is set to a script illustrated in FIG. 6, then in step S15, the script is transmitted to the smart contract network 4 together with the transaction template, and finally, the script is reflected to the distributed ledgers of all of the terminals. The user can check a time set in the time lock by viewing the script registered in the distributed ledger of the user device. In the example illustrated in FIG. 6, the constant time period is a time period required for connecting 110 blocks after a time point at which the funding transaction (FIG. 2: S11) is included in a blockchain.

Condition 2: The outputs of the transaction template are limited by a hash lock. The user can unlock the script by using a pre-image (original data) of the hash and the electronic signature of the user. In this case, the "hash lock" is a condition under which the settlement transaction generated by using the transaction template becomes usable when a pre-image corresponding to a specified hash is submitted at an input of a next transaction.

In the present embodiment, the service provider device 2 generates any pre-image at the time of generating the transaction template, and sets a hash of the pre-image to a script. However, the pre-image is not made public at a setting stage. As already described at a section of "the condition 1", the script is also shared by the user via the smart contract network 4, and thus, if the user device 1 can acquire the pre-image of the hash, the settlement transaction becomes usable together with the script, the pre-image, and the electronic signature of the user.

The conditions 1 and 2 are effective after the transaction template is subjected to the "settlement" process, and then, is recorded in the blockchain for cryptocurrency as a complete settlement transaction (see a "settlement" process described later). The settlement transaction becomes usable only if either one of the conditions 1 and 2 is satisfied.

The condition 1 indicates that the service provider device 2 can transfer the funding from the multisig address to an address (a wallet) of the service provider device 2 only after a specified time lock. Specifically, in the "settlement" process, the service provider device 2 becomes able to freely transfer funds that are supposed to be received by the service provider device 2 (the amount of payment of the output 1 in FIG. 5) among the funds funded from the multisig address after an elapse of a time required for connecting a constant number of blocks (for example, 110 blocks) from when the transaction template is broadcast as a settlement transaction that is a complete transaction, and then, the settlement transaction is included in the blockchain.

If the service provider commits a breach of trust (see the "cancellation process") during this waiting time, the user can recover, in other words, fund (refund), to an address of the user, all funds funded from the multisig address under the condition 2 (both of the output 1 and the output 2).

In the condition 2, if the pre-image corresponding to the hash lock specified in the script is specified for an input of a transaction following the settlement transaction, the settlement transaction becomes useable only with the electronic signature of the user. The condition 2 is set as a penalty against the service provider to establish the cancellation. The details will be described in the "cancellation" process later.

The order of execution of the condition 1 or 2 is as follows: (1) if the service provider commits a breach of trust against "the consent of cancellation" before an elapse of the time lock of the condition 1, the user funds the funds (the output 1) that are supposed to be received by the service provider in the settlement transaction to an address of the user only with the electronic signature of the user by using the condition 2, and alternatively, (2) if the service provider does not commit the breach of trust, after an elapse of the time lock of the condition 1, the service provider funds the funds (the output 1) that are supposed to be received by the service provider in the settlement transaction to an address of the service provider by using the condition 1.

Then, the service provider device 2 transmits the template information transaction including the transaction template generated in step S14 to the smart contract network 4 (step S15) after an elapse of a time sufficient for fixing the block including the funding transaction transmitted in step S11 in the blockchain for cryptocurrency.

This causes the generation of a block including the template information transaction and causes the generated block to be reflected to the distributed ledgers of all of the terminals connected to the smart contract network 4 through the loose synchronization among the terminals. In this case, the transaction template is registered in the bridging contract of the blockchain for smart contract.

At this time, the service provider device 2 may cause information necessary for verifying an electronic signature for a next payment process (for example, a public key related to a cryptocurrency address of the user device 1) and information necessary for verifying the settlement process (for example, the script illustrated in FIG. 6) to be included in the sample information transaction in addition to the transaction template, and then, transmit the thus template information transaction and register the template information transaction in the bridging contract. Alternatively, the bridging contract may have the information necessary for verifying the electronic signature and the information necessary for verifying the settlement process in advance.

Next, the "payment" process will be described.

Figure 7:
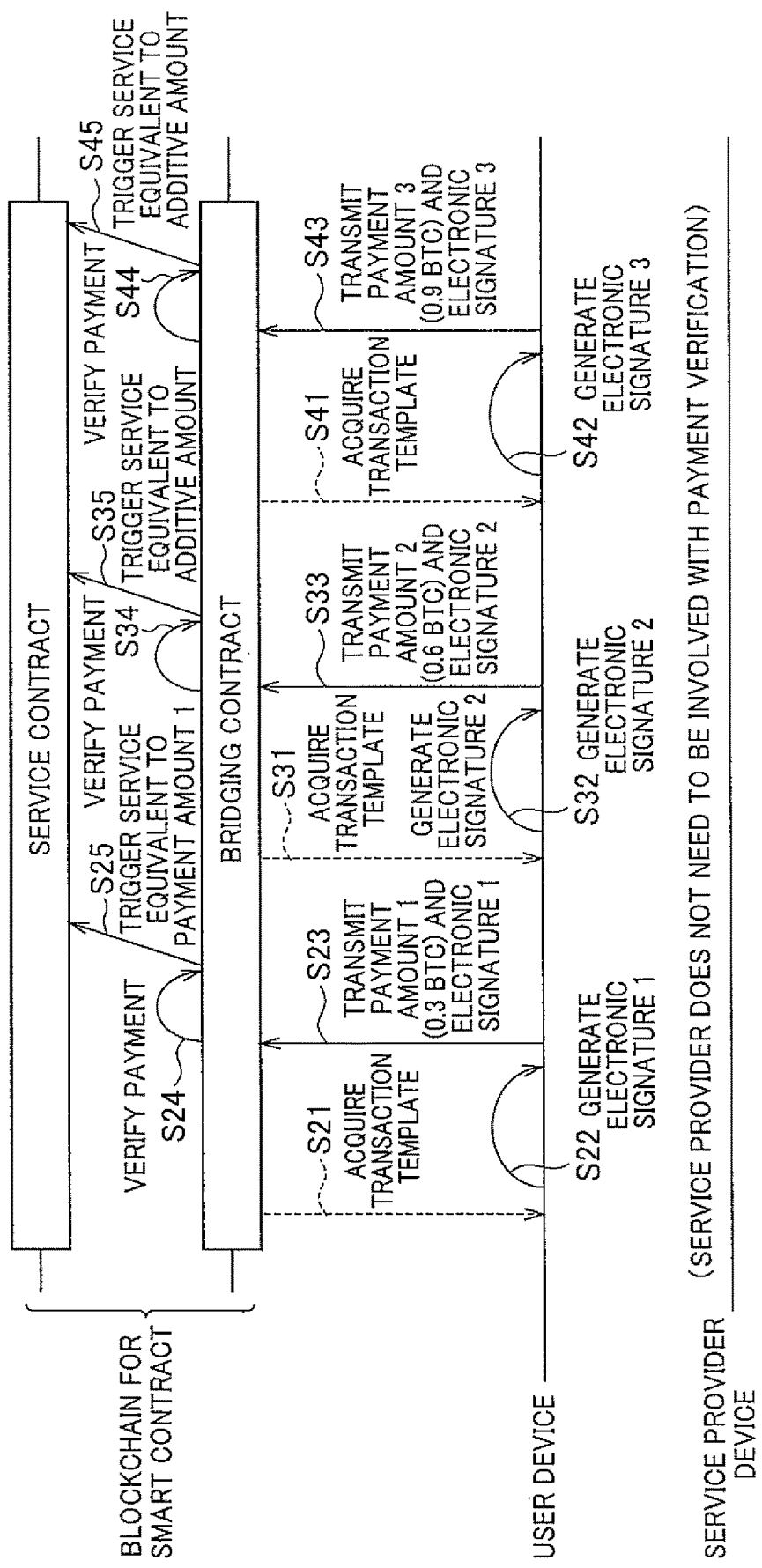
FIG. 7 is a schematic view illustrating a "payment" process.

FIG. 7 illustrates a schematic view of the "payment" process. FIG. 7 illustrates an example of performing the payment process three times while updating the amount of payment.

First, in the first payment process, the user device acquires the transaction template registered by the service provider device 2 in the "setting" process from the bridging contract of the distributed ledger of the user device 1 (step S21). Then, the user device 1 creates an electronic signature 1 from the transaction template (step S22).

Figure 8:
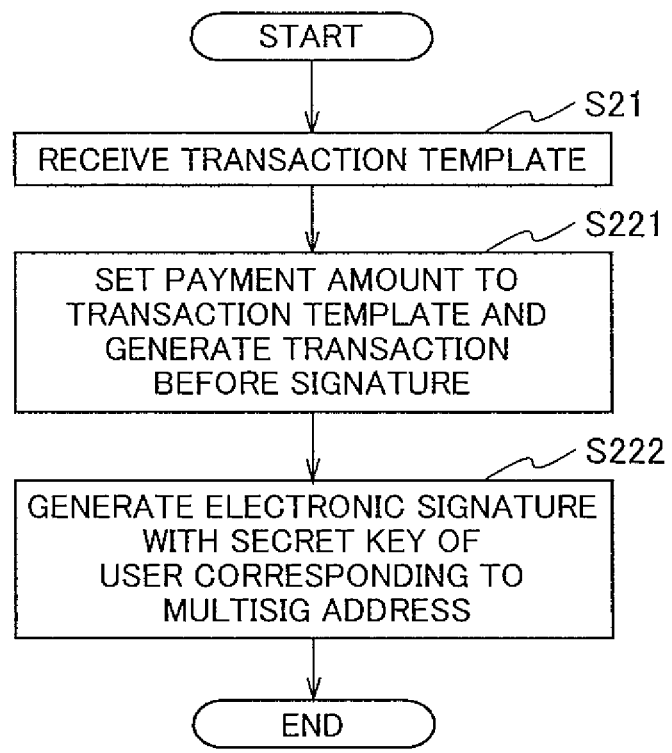
FIG. 8 is a flowchart showing processes for creating an electronic signature by a user device.

FIG. 8 is a flowchart showing processes of steps S21 and S22 of the user device 1. As described above, the user device 1 acquires the transaction template from the bridging contract (step S21). Then, the user device 1 sets the amount of payment 1 (in this case, it is set to be 0.3 BTC) to the acquired transaction template and generates a pre-signature transaction 1 (step S221). When user device 1 sets the amount of payment 1, the amount of money funded that becomes a change for the user (1.0 BTC–0.3 BTC—the commission for payment) is also appropriately calculated and set on the user terminal. The commission for payment may be determined among the users, it may be adopted a fixed value for each service or the like. Further, the user device 1 generates the electronic signature 1 for the pre-signature transaction 1 with a secret key of the user corresponding to the multisig address (step S223).

Referring back to FIG. 7, the user device 1 generates a transaction for registering, in a bridging contract, pieces of information on the amount of payment 1 and the electronic signature 1 that are included in the transaction (the payment information transaction) and transmits the generated transaction to the smart contract network 4 (step S23). This causes the generation of a block including the transaction and causes the block to be reflected to the distributed ledgers of all of the terminals connected to the smart contract network 4 through the loose synchronization among the terminals. In this case, in the blockchain for smart contract, the amount of payment 1 and the electronic signature 1 are registered in each bridging contract of each terminal.

At the time of registering the block including the transaction in the distributed ledgers, a predetermined process (a payment verification process) by the bridging contract is performed on all of the terminals (step S24).

Figure 9:
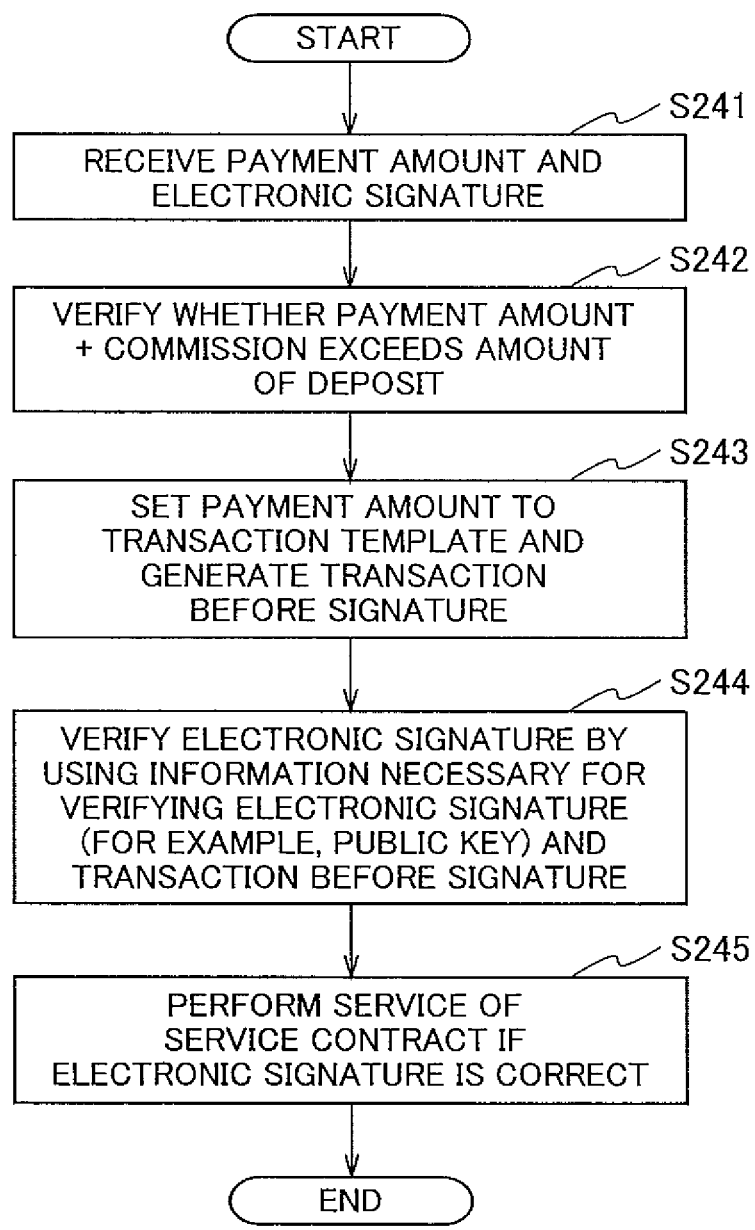
FIG. 9 is a flowchart showing processes for verifying the payment by a bridging contract.

FIG. 9 is a flowchart showing the verification process in step S24 performed by the bridging contract. First, the bridging contract acquires "a transaction for registering the electronic signature 1 and the amount of payment 1 (0.3 BTC)" that are transmitted by the user device 1 in step S23 (step S241). The bridging contract verifies whether the amount of money acquired by adding the amount of payment 1 of the acquired transaction to the commission for payment (commissions paid to minors in the blockchain for cryptocurrency) exceeds the amount of deposit (1.0 BTC) (step S242).

If the bridging contract verifies that the added amount does not exceed the amount of deposit (if the validity is verified), the bridging contract verifies the electronic signature 1 included in the payment information transaction by using the amount of payment and the transaction template. Specifically, the bridging contract generates the pre-signature transaction by setting the amount of payment 1 to the transaction template registered in the bridging contract in advance in the setting process, (see FIG. 3) (step S243). When the bridging contract sets the amount of payment 1, the amount of money funded as the change to the user (1.0 BTC–0.3 BTC—the commission for payment) is also appropriately calculated and set on the bridging contract. Then, the bridging contract verifies the electronic signature 1 by using the generated pre-signature transaction (step S244).

As a method for verifying the electronic signature, it is known that a public key for verification can be restored by using a message before signature and an electronic signature in an electronic signature of an ECDSA scheme used in Bitcoin or the like.

The bridging contract verifies whether the electronic signature 1 of the transaction acquired in step S241 is valid by using, for example, the information necessary for verifying the electronic signature registered in advance in step S15 or the like in FIG. 3 (a public key, a hash of the public key and the like). In other words, the bridging contract restores the public key by using the generated transaction before signature and the electronic signature 1 transmitted from the user device 1, and verifies that the electronic signature 1 is valid if the restored public key matches the public key registered in advance. On the other hand, if the restored public key does not match the public key registered in advance, the bridging contract verifies that the electronic signature 1 is not valid.

If the bridging contract verifies that the electronic signature 1 is valid, the bridging contract invokes a service contract (step S245).

Referring back to FIG. 7, if the bridging contract verifies that the electronic signature 1 is valid, the bridging contract invokes the service contract to perform a service that is worth the amount of payment 1 (step S25). Specifically, the bridging contract invokes a method of the service contract by using the amount of payment 1 or the like as a parameter (step S25). This causes the service contract to perform a predetermined service that is worth the amount of payment (for example, the transfer of rights of digital contents and the like).

In FIG. 7, the user device 1 performs the payment process of steps S21 to S25 three times, and the service contract performs services for each of the payment processes. A second payment process (steps S31 to S35) and a third payment process (steps S31 to S35) are similar to the first payment process (steps S21 to S25).

However, with respect to the amount of payment, the relationship of the amount of payment 1 (0.3 BTC)<the amount of payment 2 (0.6 BTC)<the amount of payment 3 (0.9 BTC) holds, and a final payment amount (0.9 BTC) becomes a final settlement amount. The amounts of payment in and after the second payment process are each acquired by adding the amount of payment for a service in a current process to the amount of payment in the previous payment process. In an example illustrated in FIG. 7, the user device 1 performs the payment process three times, and a service that is worth 0.3 BTC is provided for each payment process.

In FIG. 7, the user device 1 broadcasts the payment information transaction to the smart contract network 4 three times (steps S23, S33, and S43), but if a "settlement" process described below is performed in the third payment process, the service provider device 2 is not allowed to perform a settlement by using pieces of payment information in the first and second payment processes. Even if the service provider device 2 generates a settlement transaction by using, for example, the pieces of payment information in the first and second payment processes and broadcasts the generated transaction, such a transaction is excluded in a process of consensus verification of the blockchain for cryptocurrency and becomes invalid in the network.

The "setting" and "payment" processes have been described. Here, the cancellation" process of the "payment", which has a flow different from that of a normal payment will be described. In the "cancellation" process, unlike the "payment" process, it is possible to register the amount of money lower than the amount of payment registered in advance. In the cancellation processes, it is necessary to register the new transaction template to invalidate the previous payment.

Figure 10:
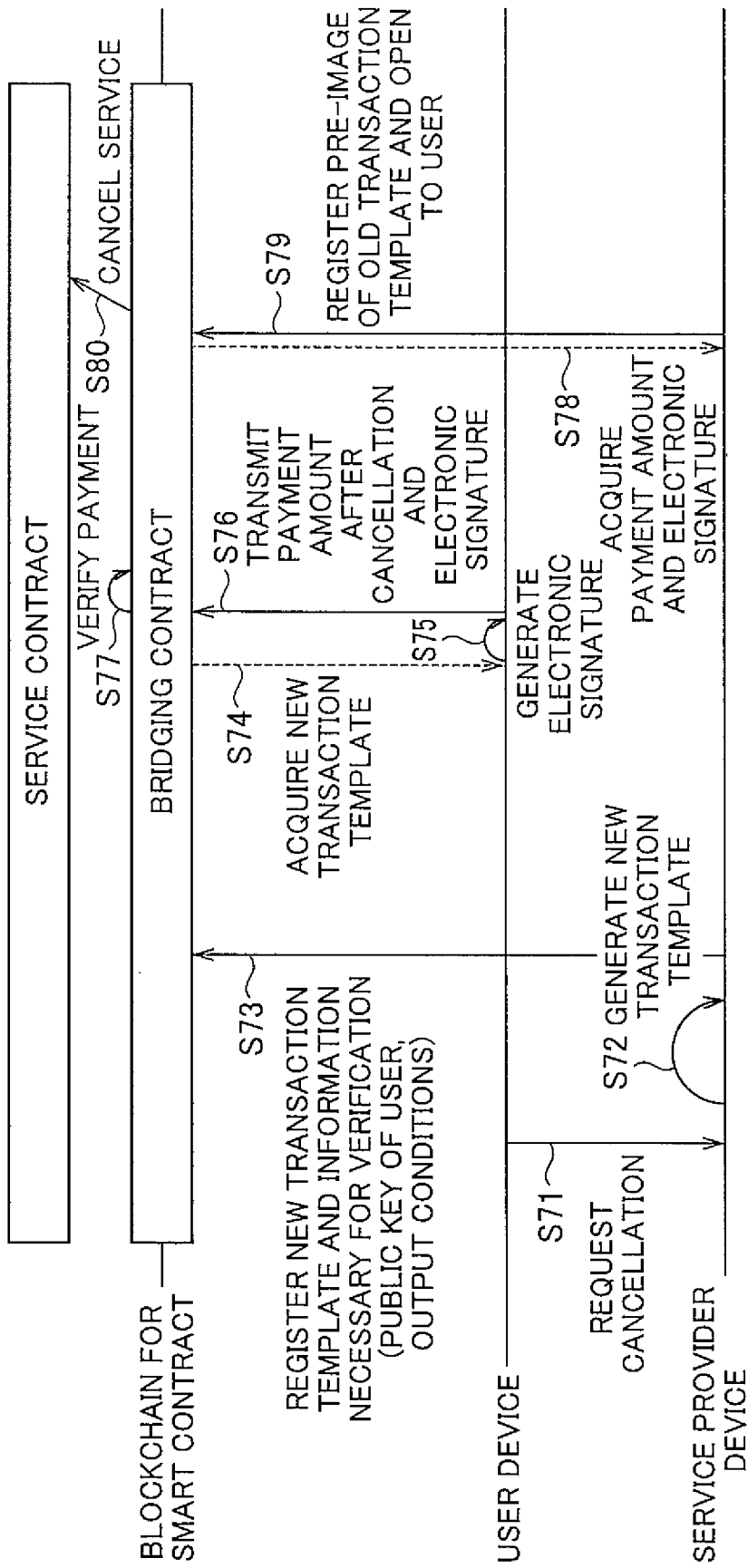
FIG. 10 is a schematic view illustrating a "cancellation" process.

FIG. 10 illustrates a summary of the "cancellation" process. By the process illustrated in FIG. 10 being performed, it is considered that a consensus of the cancellation of the "payment" process is built between the user and the service provider.

The user device 1 transmits a cancellation request to the service provider device 2 (step S71).

The service provider device 2 generates a new transaction template (another transaction template) (step S72) after receiving the cancellation request. Specifically, the service provider device 2 generates a new pre-image and generates the new transaction template and new scripts for output conditions by using hashes of the pre-image. The new transaction template and the new scripts for the output conditions are the same as the transaction template in the "setting" process (FIG. 3: S14) and the scripts for the output conditions (FIG. 6) except for hashes of pre-images. Although the pre-image is not especially specified, the pre-image needs to be one that may not be easily presumed.

The service provider device 2 transmits a template information transaction including the transaction template generated in step S72 to the smart contract network 4 (step S73). This causes the generation of a block including the template information transaction and causes the block to be reflected to the distributed ledgers of all of the terminals connected to the smart contract network 4 through the loose synchronization among the terminals. In this case, the new transaction template is registered in the bridging contract of the blockchain for a smart contract.

At this time, the service provider device 2 may transmit the template information transaction after causing the template information transaction to include, in addition to the new transaction template, information necessary for verifying the electronic signature in the cancellation process (for example, the public key related to the cryptocurrency address of the user device 1) and information necessary for verifying the settlement process (for example, scripts indicating output conditions) and register the transaction in the bridging contract. Alternatively, the bridging contract may have the information necessary for verifying the electronic signature and the information necessary for verifying the settlement process in advance.

The user device 1 acquires a new transaction template from the bridging contract of the distributed ledger of the user device 1 (step S74). Then, the user device 1, as similar to the processes of steps S22 and S23 in FIG. 7, generates a new electronic signature and transmits a payment information transaction (another payment information transaction) for registering new payment information (the amount of payment and the electronic signature) in the bridging contract to the smart contract network 4 (steps S75 and S76) by using the new transaction template. This causes the generation of a block including the payment information transaction and causes the block to be registered in the distributed ledgers of all of the terminals connected to the smart contract network 4. The amount of payment in the new payment information is lower than the amount of payment included in the latest payment information transaction generated in the "payment process".

After the block including the new payment information transaction is registered in the distributed ledger, the bridging contract verifies the payment on all of the terminals (step S77). In other words, the bridging contract verifies the amount of payment and the electronic signature of the new payment information transaction. The bridging contract performs a payment verification process similar to the process of step S24 in FIG. 7. Further, the bridging contract verifies whether the new payment amount is lower than the previous payment amount of the payment information transaction, and if the new payment amount is lower than the previous payment amount, determines that the new payment amount is valid.

The service provider device 2 acquires a new payment information transaction from the distributed ledger of the service provider device 2 and presents the amount of payment of the acquired transaction to the service provider. The service provider confirms the amount of payment and determines whether to consent to the cancellation requested by the user. The service provider is allowed to decide not to consent to the cancellation requested by the user in a case, for example, the cancellation requested by the user is unconscionable. If the service provider decides not to consent to the requested cancellation, the service provider device 2 does not perform the next step S79.

If the service provider intends to consent to the cancellation, the service provider device 2 generates a pre-image transaction for registering a pre-image corresponding to a hash set in the condition 2 of the old transaction template (FIG. 3: S15) in the bridging contract and transmits the generated transaction to the smart contract network 4 (step S79). This causes the generation of a block including the pre-image transaction and causes the block to be registered in the distributed ledgers of all of the terminals connected to the smart contract network 4. Accordingly, the pre-image of the hash of the condition 2 of the old transaction template is shared by the user device 1. In the present embodiment, if the service provider device 2 transmits the pre-image transaction, it is considered that the service provider consents to the cancellation.

After the block including the pre-image transaction is registered in each of the distributed ledgers of each of the terminals, the bridging contract performs a service cancellation process on all of the terminals (step S80). The bridging contract invokes a service contract to cancel a service that has already been performed in accordance with the amount of payment in step S74. Specifically, the bridging contract invokes a method of the service contract by using the predetermined amount of money (for example, the differential amount between the previous payment amount and the current payment amount.) as a parameter. This causes the service contract to cancel the predetermined service corresponding to the differential amount.

Finally, the "settlement" process will be described.

Figure 11:
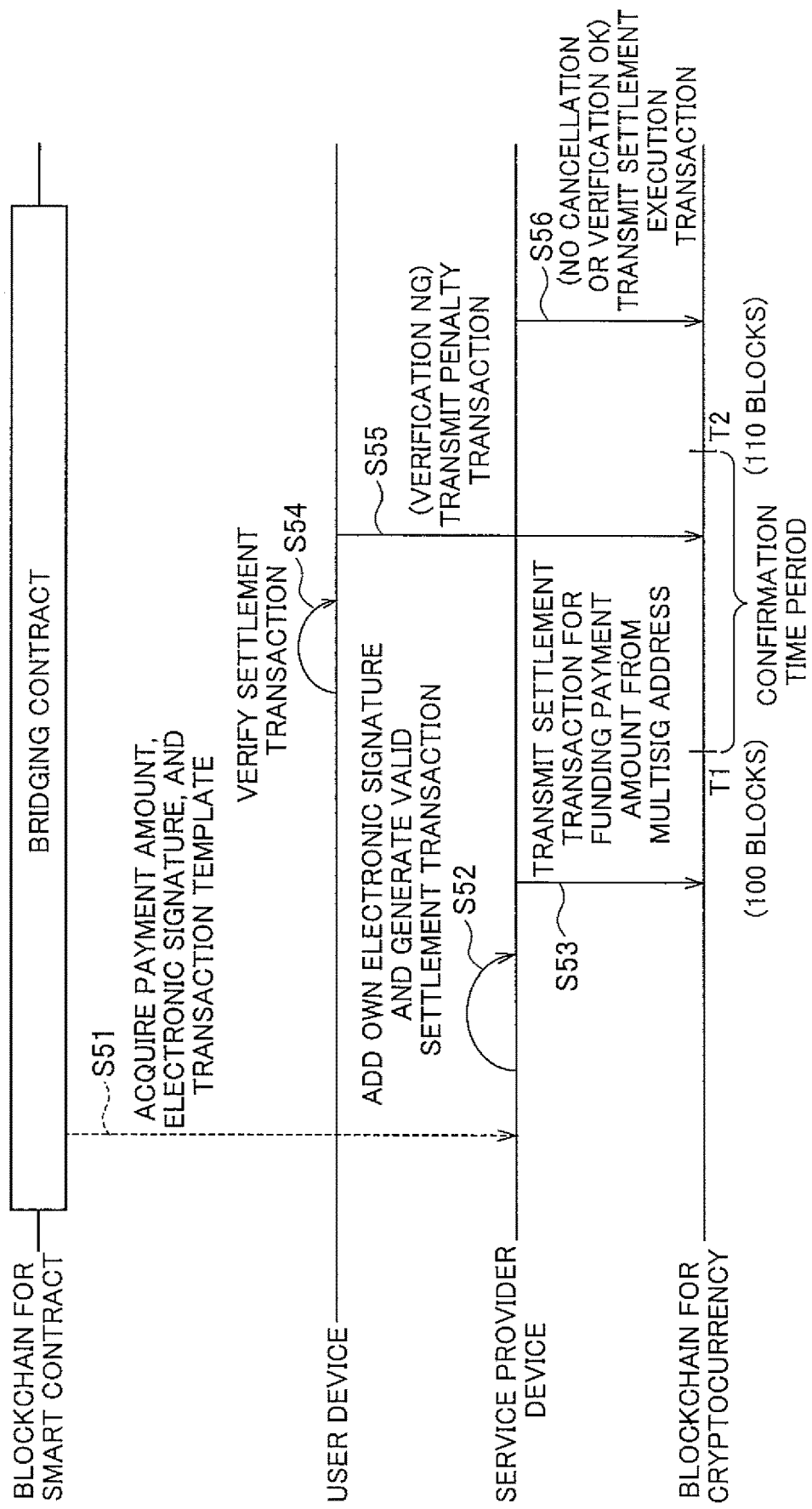
FIG. 11 is a schematic view illustrating a "settlement" process.

FIG. 11 is a diagram illustrating the "settlement" process. The service provider device 2 closes the payment at any timing and reflects the payment on the blockchain for cryptocurrency. First, the service provider device 2 acquires the final payment amount, the electronic signature, and the transaction template from the distributed ledger of the service provider device 2 (the bridging contract) (step S51).

The final payment amount, the electronic signature, and the transaction template here are the amount of payment 3, an electronic signature 3, and the transaction template illustrated in FIG. 7 if the cancellation process is not performed, and are the new payment amount, electronic signature, and transaction template illustrated in FIG. 10 if, alternatively, the cancellation process is performed.

Then, the service provider device 2 sets the amount of payment and the electronic signature acquired in step S51 to the transaction template to generate a settlement transaction. The settlement transaction at this point is "a transaction which has an electronic signature of the user device 1 only and which is to be funded from the multisig address." In other words, the settlement transaction at this point is not a valid transaction because the settlement transaction does not have the electronic signature of the service provider device 2.

Therefore, to enable funding from the multisig address, the service provider device 2 gives an electronic signature to the settlement transaction with a secret key of the service provider device 2 corresponding to the multisig address on a terminal of the service provider device 2, and then, generates the settlement transaction which is valid in the blockchain for cryptocurrency (step S52). The settlement transaction after signature becomes valid in the blockchain for cryptocurrency because the settlement transaction has two electronic signatures of both the user and the service provider.

The service provider device 2 transmits the settlement transaction after signature to the cryptocurrency network 3 (step S53). The service provider needs to transmit the settlement transaction during a time period from after the block of the funding transaction is registered in the distributed ledgers until 100 blocks are connected in accordance with the output conditions of the funding transaction (S11 in FIG. 3).

The transmission of the settlement transaction to the cryptocurrency network 3 causes the generation of a block including the settlement transaction and causes the block to be reflected to the distributed ledgers of all of the terminals connected to the cryptocurrency network 3 through the loose synchronization among the terminals.

Accordingly, a change to the user, that is the output 2 of the settlement transaction, is funded to the user address. On the other hand, with respect to the output 1 of the settlement transaction, the settlement transaction becomes usable if, in the blockchain for cryptocurrency, either one of the conditions 1 and 2 of a script indicated by a hash set at a destination to which the output 1 of the settlement transaction (a transaction template) is satisfied.

This causes the service provider to perform the cancellation of the payment in the present embodiment. In other words, in the present embodiment, it is possible to prevent a transaction that violates the consent of cancellation requested by the user in spited of the fact that the service provider has consented to the cancellation by transmitting the pre-image transaction.

Specifically, a time point at which the service provider can acquire the predetermined amount of payment among the deposit funded to the multisig address is after an elapse of a time period specified in the time lock of the condition 1. In the illustrated example, a time point is after an elapse of a time period (T2) required for connecting 110 blocks from when the block of the funding transaction (S11 in FIG. 3) is registered in the distributed ledgers. That is, a time point at which the service provider device 2 transmits a settlement execution transaction for funding the amount of payment specified in the settlement transaction to the address of the service provider device 2 is after an elapse of the time period set in the time lock (T2) of the condition 1 (step S56).

If the service provider device 2 consents to the cancellation, the service provider device 2 makes the pre-image public to the user by, in step S79 in FIG. 10, registering the pre-image of the hash used in the old transaction template in the distributed ledgers of the bridging contract. Therefore, even if the service provider commits a breach of trust against the user by violating the consent of cancellation and transmits the settlement transaction by using the old transaction template which is supposed to be already canceled, the user can unlock the hash lock of the condition 2 by using the pre-image of the hash that is made public.

In this case, the user can recover the amount of payment to be paid to the service provider to the user address (step S55) by transmitting a a penalty transaction for funding the amount of payment of the output 1 specified in the settlement transaction to the user address before an elapse of the time period (T2) set in the time lock of the condition 1. The change of the output 2 of the settlement transaction is funded to the user address by registering the settlement transaction (S53) in the blockchain.

As described above, in the present embodiment, if the service provider consents to the cancellation, the penalty transaction of the user functions as penalties (penalty charges) in accordance with the condition 2, and therefore, it becomes difficult for the service provider to take an action to commit a breach of trust against the user. In other words, by setting the output conditions to the settlement transaction (the transaction template), it becomes difficult for the service provider to fund the amount of payment of the output 1 of the settlement transaction to the address of the service provider before the user does.

Hereinafter, processes at and after step S53 will be described for each of separated cases that are a case where the cancellation process is not performed and alternatively a case where the cancellation process is performed.

<If Cancellation Process is not Performed>

The service provider device 2 transmits the settlement transaction generated by using the amount of payment 3, the electronic signature 3, and the transaction template in FIG. 7 to the cryptocurrency network 3 (step S53). The service provider device 2 transmits the settlement transaction until an elapse of a time period (T1) specified in the output conditions of the funding transaction (S11 in FIG. 3).

Then, the service provider device 2 transmits the settlement execution transaction for funding the amount of payment (the output 1) specified in the settlement transaction to the address of the service provider device 2 to the cryptocurrency network 3 (step S56) after an elapse of the time period (T2) specified in the time lock of the condition 1.

This causes the amount of payment 3 of 0.9 BTC to be funded from the multisig address to the address of the service provider to complete the settlement.

Until the service provider device 2 transmits the settlement transaction to the cryptocurrency network 3 (step S53), that is, until the service provider closes the payment, the user device 1 performs the n-th payment process illustrated in FIG. 5, updates the amount of payment, and can receive additional services.

<If Cancellation Process is Performed>

In principle, the service provider device 2 transmits the settlement transaction generated by using the new payment amount, the electronic signature, and the transaction template registered in the cancellation process to the cryptocurrency network 3 (step S53). The service provider device 2 transmits the settlement transaction until an elapse of the time period (T1) specified in the output conditions of the funding transaction (S11 in FIG. 3).

To prepare for a case where the service provider commits a breach of trust against the user (violates the cancellation) while knowing about the penalties, the user monitors whether the settlement transaction is included in the blockchain for cryptocurrency and verifies the settlement transaction (S54). Specifically, the user device 1 refers to the distributed ledger of the user device 1 and verifies whether the settlement transaction is present, and if the settlement transaction is present, the user device 1 verifies whether the amount of payment of the settlement transaction is the amount of payment transmitted in the cancellation process.

If the amount of payment of the settlement transaction is not the amount of payment transmitted in the cancellation process (if a verification result is NG), the user device 1 transmits the penalty transaction for funding the amount of payment specified for the output 1 of the settlement transaction to the address of the user device 1, to the cryptocurrency network 3 (step S55) before an elapse of the time period (T2) of the condition 1. This enables the user to recover the amount of payment (the output 1) to be paid to the service provider in the settlement transaction to the user address as a penalty. If the settlement transaction is not transmitted, the user device transmits the refund transaction for refunding the deposit funded to the multisig address in the funding transaction to the address of the user device 1.

If the amount of payment of the settlement transaction is the amount of payment transmitted in the cancellation process (if a verification result if OK), the user device 1 does not transmit the penalty transaction of step S55. This causes the service provider device 2 to transmit the settlement execution transaction (step S56) after an elapse of the time period (T2) of the condition 1. Accordingly, the service provider can fund, to the address of the service provider, the amount of payment that is specified for the output 1 of the settlement transaction and is consented in the cancellation process.

Figure 12:
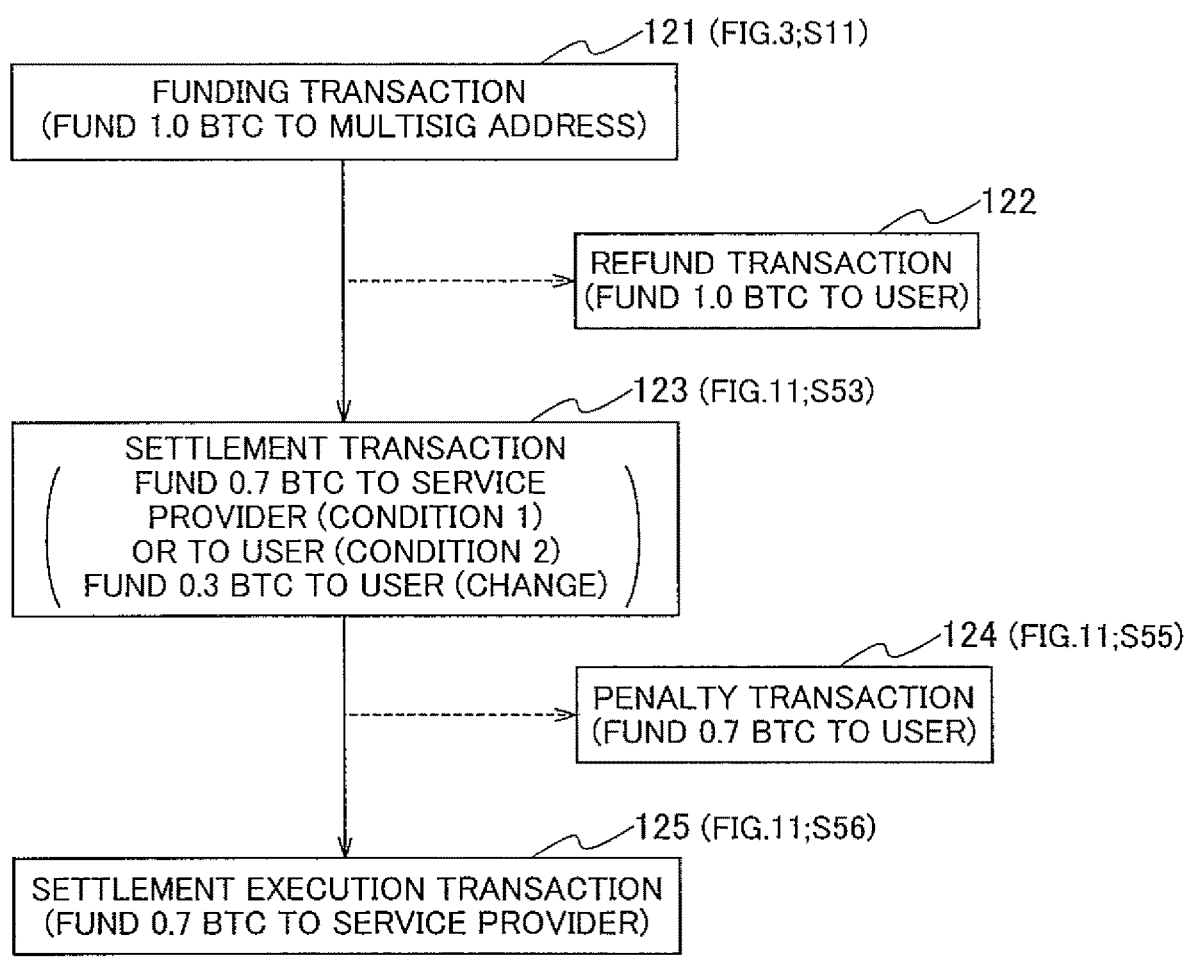
FIG. 12 illustrates the relationship among transactions in a blockchain for cryptocurrency.

FIG. 12 illustrates the relationship among transactions in the blockchain for cryptocurrency. A funding transaction 121 is a transaction for the user to fund the deposit of 1.0 BTC to the multisig address as described in step S11 of FIG. 3. If a settlement transaction 123 (FIG. 11: S53) is not transmitted during the output conditions of the funding transaction (for example, the time lock of 100 blocks), the user transmits a refund transaction 122 and recovers the deposit of 1.0 BTC which has been funded in the funding transaction to the user address. This can prevent the interruption caused against the communication with the service provider and the deadlock of the deposit of the user.

On the other hand, if the settlement transaction 123 (FIG. 11: S53) is transmitted during the output conditions of the funding transaction, and also if the service provider violates the consent of cancellation process, the user transmits the penalty transaction 124 (FIG. 11: S55) and funds the amount of payment (0.7 BTC) set in the output of the settlement transaction to the user address in accordance with the condition 2 of the settlement transaction (the output 1).

Further, if the settlement transaction 123 is transmitted and also in the case of either one of a case where the cancellation process is not performed and the consented cancellation process is correctly performed, the service provider transmits the settlement execution transaction 125 (FIG. 11: S56) and funds the amount of payment (0.7 BTC)

set in the output 1 of the settlement transaction to the address of the service provider in accordance with the condition 1 of the settlement transaction (the output 1).

The change (0.3 BTC) as the output 2 of the settlement transaction is funded to the user address after the settlement transaction is registered in the blockchain.

In the present embodiment, costs arising from the user terminal 1 monitoring the blockchain for cryptocurrency are reduced by adjusting the time period (T1) set in the time lock of the funding transaction and the time period (T2) set in the time lock of the condition 1 of the settlement transaction (the transaction template). Specifically, by setting the time periods of the time lock to have the relation of T1<T2, the time lock for the settlement transaction is set to be surely longer than the time lock for the funding transaction. From the above reason, the service provider needs to transmit the settlement transaction (step S53) before the time lock of T1 expires, and even if the service provider transmits the settlement transaction, the service provider is not allowed to use the settlement transaction (funding the amount of payment of the output 1 to the address of the service provider) until an end of T2 after T1.

Therefore, if T2 of the condition 1 registered together with the transaction template can be ensured to be longer than T1, at least, the user device 1 does not need to monitor the settlement transaction of the service provider device 2 until an end of T1, and it is enough if the user device 2 checks the settlement transaction until an end of T2 after T1. More specifically, the user device 1 is connected to the cryptocurrency network 3 until an end of T2 after T1 or refers to the distributed ledger of the user device 1 and checks "whether the settlement transaction is already included in a block" and "whether the settlement transaction is allowable" (S54). Therefore, by the time periods of T1 and T2 being set, a time period during which the user device connects to the blockchain for cryptocurrency is limited, and the user device does not need to constantly monitor the blockchain.

In the present embodiment, a smart contract is used to ensure that the relationship of T1<T2 holds. Specifically, at the time of registering the transaction template (step S15 in FIG. 3 and step S73 in FIG. 10), the bridging contract verifies whether the time period (T2) set in the time lock of the transaction template is longer than the time period (T1) set in the time lock of the funding transaction, and if the relationship of T1<T2 is not satisfied, the bridging contract transmits an error message to the service provider device 2. As illustrated in FIG. 5, T1 is set to an input (script) of the transaction template.

As described above, in the embodiment, a plurality of output conditions are set to the template of the transaction (the output 1), and the settlement transaction becomes usable when any one of the plurality of output conditions is satisfied. This enables the efficient cooperation among the plurality of blockchains and the reflection of the cancellation of payment consented between the user and the service provider to the blockchain for cryptocurrency in the present embodiment. Specifically, even if the service provider commits a breach of trust against the user by violating the consent of cancellation and transmits the settlement transaction by using the old transaction template which is supposed to be already canceled, the user can unlock the hash lock of the condition 2 by using the pre-image of the hash that is made public by the service provider in the cancellation process. That is, before an elapse of a time period set in the time lock of the condition 1, the user transmits the penalty transaction for funding the amount of payment specified in the settlement transaction to the user address and can recover the deposit to the user address.

As described above, in the present embodiment, the output conditions are set to the transaction template. Accordingly, if the service provider consents to the cancellation, the penalty transaction of the user functions as a penalty in accordance with the condition 2. Further, due to the constraint imposed by the time lock of the condition 1, it is difficult for the service provider to fund the amount of payment of the settlement transaction to the address of the service provider before the user does. Therefore, it becomes difficult for the service provider to to take an action to commit a breach of trust against the user.

Further, in the present embodiment, the user can cancel the transmitted payment information transaction by performing the cancellation process illustrated in FIG. 10. Further, by the service provider transmitting the pre-image transaction, the user can confirm that the service provider has consented to the cancellation.

Further, in the present embodiment, the user device transmits, to the network of the blockchain for cryptocurrency, the funding transaction for funding the predetermined amount of deposit to the multisig address, and the funding transaction is set with the output condition which enables the use of the funding transaction only with the electronic signature of the user device after an elapse of the first time period (T1). This can prevent, in the present embodiment, the interruption caused against the communication with the service provider and the deadlock of the deposit of the user.

In the present embodiment, the plurality of output conditions set to the transaction template include the time lock by which the settlement transaction becomes usable after an elapse of the second time period, and the smart contract verifies whether the second time period is longer than the first time period. Therefore, in the present embodiment, the time period during which the user confirms the blockchain for cryptocurrency (the cryptocurrency network 3 or the distributed ledger of the user device) is limited, and the user does not need to be constantly connected to the blockchain to monitor the settlement transactions and the like, and this leads to the reduction in operation costs.

Further, in the present embodiment, the service provider device 2 is not involved in the "payment" process, and all processes from payment verification to service provision are performed on the blockchain for smart contract. Thus, in the present embodiment, the service provider device 2 does not need to connect to the blockchain for smart contract in the processes from payment verification to service provision. In other words, the service provider device 2 does not need to constantly monitor the blockchain for smart contract, and this leads to the reduction in operation costs.

Further, in the present embodiment, a situation in which a series of payment process are not correctly performed due to failures of the service provider device 2 or frauds by the service provider can be prevented because the service provider device 2 is not involved in the processes from payment verification to service provision.

Further, in the present embodiment, a more transparent and auditable system can be built because the bridging contract and the service contract of the blockchain for smart contract autonomously perform the processes from payment verification to service provision.

Further, in the present embodiment, the transaction template is registered in the blockchain for smart contract and the user device 1 and the service provider device 2 acquire the transaction templates from the distributed ledgers of the user device 1 and the service provider device 2 respectively to use the transaction templates, and thus, the number of transmission of transactions can be reduced, the enlargement of blocks can be suppressed, and calculation costs of blocks can be reduced.

Further, the present embodiment uses the transaction with the multisig address which requires both the electronic signature of the user and the electronic signature of the service provider. This can prevent the registration of the settlement transaction in the blockchain for cryptocurrency without permission by the user device 1 and the use of cryptocurrency. That is, in the present embodiment, only the service provider device 2 can add the electronic signature of the service provider device 2 to the settlement transaction and register the settlement transaction in the blockchain for cryptocurrency. In other words, the service provider device 2 can control the timing of settlement and can finalize the settlement at any timing.

The user device 1 and the service provider device 2 described above may be implemented by using a general-purpose computer system including, for example, a central processing unit (CPU) or processor, memory, a storage (HDD: hard disk drive, SSD: solid state drive), a communication device, an input device, and an output device. In this computer system, each function of each device is implemented by the CPU executing a specified program loaded into the memory. For example, the functions of the user device 1 are implemented by the CPU of the user device 1 executing a program for the user device 1, and the functions of the the service provider device 2 are implemented by the CPU of the service provider device 2 executing a program for the service provider device 2, respectively.

Further, the program for the user device 1 and the program for the service provider device 2 may be stored in a computer-readable recording medium such as an HDD, SSD, USB memory, CD-ROM, DVD-ROM, and an MO, or may be distributed via a network.

Further, the present invention is not limited to the above-described embodiment, and various modifications are possible within the scope of the gist thereof. For example, the smart contract of the present embodiment includes two types of smart contracts that are the bridging contract and the service contract, as illustrated in FIG. 1. However, a single smart contract may have functions of both of the bridging contract and the service contract.

Further, in the present embodiment, descriptions have been made by taking a case where the number of the service contract is one as an example, but the number of the service contract may be more than one. In this case, each of the service contracts performs a different type of service, and a bridging contract invokes a service contract corresponding to a service specified in a payment information transaction.

EXPLANATION OF THE REFERENCE NUMERALS

1 User device
11 Transaction generation unit
12 Cancellation processing unit
13 Blockchain client
14 Cryptocurrency blockchain client
15 Smart contract blockchain client
2 Service provider device
21 Transaction generation unit
22 Transaction template generation unit
23 Blockchain client
24 Cryptocurrency blockchain client
25 Smart contract blockchain client
3 Network of blockchain for cryptocurrency
4 Network of blockchain for smart contract
41 Bridging contract
42 Service contract

The invention claimed is:

1. A settlement system in which a first blockchain and a second blockchain are cooperated, the settlement system comprising:
   a service provider device that transmits a template information transaction that includes a template of a transaction to a network of the first blockchain;
   a user device that transmits, to the network of the first blockchain, a payment information transaction that includes an electronic signature generated by using the template of the transaction registered in the first blockchain and a payment amount; and
   a smart contract included in the first blockchain, wherein:
      the smart contract verifies the electronic signature included in the payment information transaction by using the payment amount and the template of the transaction,
      the service provider device generates a settlement transaction by using the template of the transaction registered in the first blockchain, the electronic signature, and the payment amount, and transmits the settlement transaction to a network of the second blockchain to thereby cause (i) generation of a block including the settlement transaction and (ii) the block to be reflected to terminals connected to second blockchain through loose synchronization among the terminals,
      a plurality of output conditions are set to the template of the transaction, and the settlement transaction becomes usable when any one of the plurality of output conditions is satisfied, and
      the service provider device generates a pre-image at time of generating the template of the transaction, and set a hash of the pre-image, and
      the plurality of output conditions include a first condition including a time lock by which the settlement transaction becomes usable after an elapse of a second time period and a second condition indicating that the settlement transaction becomes usable based on the hash of the pre-image and the electronic signature of the user device being submitted by the user device,
   wherein the user device:
      transmits a cancellation request of the payment information transaction to the service provider device, and
      transmits, to the network of the first blockchain, another payment information transaction for cancellation that includes another electronic signature generated by the service provider device by using a template of another transaction registered in the first blockchain and another payment amount,
   wherein the service provider device:
      transmits another template information transaction that includes the template of the another transaction to the network of the first blockchain, and
      based on the another payment information transaction registered in the first blockchain being consented within the second time period, transmits, to the network of the first blockchain, a pre-image transaction that includes the pre-image of the hash specified in a hash lock included in the plurality of output conditions, and wherein:
the user device transmits a penalty transaction to the network of the second blockchain using the pre-image transaction, and
based on the penalty transaction being received within the second time period, the settlement transaction is funded to the user device.

2. The settlement system according to claim 1, wherein the user device transmits, to the network of the second blockchain, a funding transaction for funding a predetermined amount of deposit to a multisig address, and
the funding transaction is set with an output condition that enables a use of the funding transaction only with the electronic signature of the user device after an elapse of a first time period.

3. The settlement system according to claim 2, wherein the smart contract verifies whether the second time period is longer than the first time period.

4. A settlement method in which a first blockchain and a second blockchain are cooperated, the settlement method comprising:
transmitting, by a service provider device, a template information transaction that includes a template of a transaction to a network of the first blockchain;
generating, by a user device, an electronic signature by using the template of the transaction registered in the first blockchain; and
transmitting, by the user device, a payment information transaction that includes the electronic signature and a payment amount to the network of the first blockchain,
wherein a smart contract included in the first blockchain verifies the electronic signature included in the payment information transaction by using the payment amount and the template of the transaction,
wherein the service provider device generates (i) a settlement transaction by using the template of the transaction registered in the first blockchain, the electronic signature, and the payment amount and (ii) a pre-image at time of generating the template of the transaction, sets a hash of the pre-image, and transmits the settlement transaction to a network of the second blockchain to thereby cause (i) generation of a block including the settlement transaction and (ii) the block to be reflected to terminals connected to second blockchain through loose synchronization among the terminals,
wherein a plurality of output conditions are set to the template of the transaction, and the settlement transaction becomes usable when any one of the plurality of output conditions is satisfied, and
wherein the plurality of output conditions include a first condition including a time lock by which the settlement transaction becomes usable after an elapse of a second time period and a second condition indicating that the settlement transaction becomes usable based on the hash of the pre-image and the electronic signature of the user device being submitted by the user device,
wherein the user device:
transmits a cancellation request of the payment information transaction to the service provider device, and
transmits, to the network of the first blockchain, another payment information transaction for cancellation that includes another electronic signature generated by the service provider device by using a template of another transaction registered in the first blockchain and another payment amount,
wherein the service provider device:
transmits another template information transaction that includes the template of the another transaction to the network of the first blockchain, and
based on the another payment information transaction registered in the first blockchain being consented within the second time period, transmits, to the network of the first blockchain, a pre-image transaction that includes the pre-image of the hash specified in a hash lock included in the plurality of output conditions, and
wherein:
the user device transmits a penalty transaction to the network of the second blockchain using the pre-image transaction, and
based on the penalty transaction being received within the second time period, the settlement transaction is funded to the user device.

5. A user device in a settlement system in which a first blockchain and a second blockchain are cooperated, the user device comprising:
a funding transaction generating unit that transmits, to a network of the second blockchain, a funding transaction for funding a predetermined amount of deposit; and
a payment transaction generation unit generates an electronic signature by using a template of the transaction registered in the first blockchain by a service provider device and transmits a payment information transaction that includes an electronic signature and a payment amount to a network of the first blockchain to thereby cause (i) generation of a block including a settlement transaction and (ii) the block to be reflected to terminals connected to second blockchain through loose synchronization among the terminals,
wherein a plurality of output conditions are set to the template of the transaction, and a settlement transaction generated by the service provider device by using the template of the transaction, the electronic signature, and the payment amount becomes usable when any one of the plurality of output conditions is satisfied, and
wherein the plurality of output conditions include a first condition including a time lock by which the settlement transaction becomes usable after an elapse of a second time period and a second condition indicating that the settlement transaction becomes usable based on a hash of a pre-image and the electronic signature of the user device being submitted by the user device, the pre-image to which the hash is set and being generated by the service provider device at time of generating the template of the transaction,
wherein the user device:
transmits a cancellation request of the payment information transaction to the service provider device, and
transmits, to the network of the first blockchain, another payment information transaction for cancellation that includes another electronic signature generated by the service provider device by using a template of another transaction registered in the first blockchain and another payment amount,
wherein:
the user device transmits a penalty transaction to the network of the second blockchain using a pre-image transaction that includes the pre-image of the hash specified in a hash lock included in the plurality of output conditions, and based on the penalty transaction being received within the second time period, the settlement transaction is funded to the user device.

\* \* \* \* \*